Figure 1:
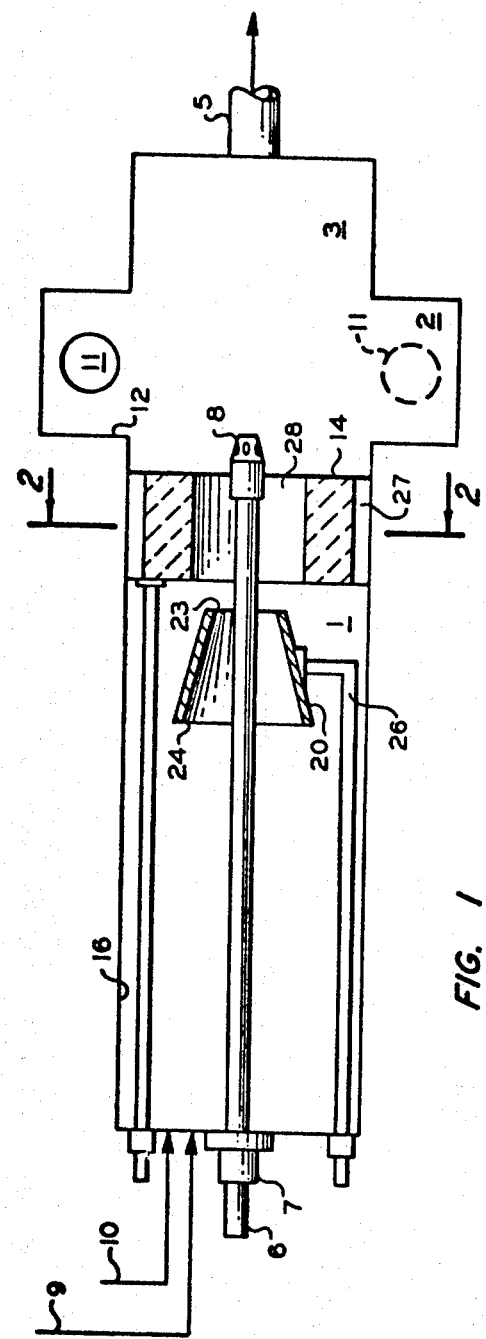

United States Patent [19]

Henderson et al.

[11] 3,753,658
[45] Aug. 21, 1973

[54] CARBON BLACK APPARATUS
[75] Inventors: Eulas W. Henderson, Bartlesville, Okla.; Glenn J. Forseth, Phillips, Tex.
[73] Assignee: Phillips Petroleum Company, Bartlesville, Okla.
[22] Filed: Mar. 15, 1971
[21] Appl. No.: 124,494

Related U.S. Application Data
[62] Division of Ser. No. 769,281, Oct. 21, 1968, Pat. No. 3,619,141.

[52] U.S. Cl. ............... 23/259.5, 23/277 R, 431/186, 431/189, 431/350, 431/353, 431/116, 423/450, 423/456
[51] Int. Cl. ........................... C09c 1/50, F23c 5/06
[58] Field of Search .................. 23/259.5, 209.4, 23/209.6; 431/186, 189, 350, 353, 116; 425/450, 456

[56] References Cited
UNITED STATES PATENTS
2,857,961  10/1958  Brown et al. ................. 431/353
3,523,759  8/1970   Kidd ............................ 23/259.5
2,785,053  3/1957   Larson et al. ............... 23/259.5 X Primary Examiner—James H. Tayman, Jr.
Attorney—Young and Quigg

[57] ABSTRACT

A carbon black reactor which comprises an axial zone, a combustion zone and a carbon black producing zone in contiguous alignment, said axial zone having choke means slidably positionable therein, said choke means having an axial passageway therethrough, and at least one aperture providing open communication between the downstream end of said choke and the upstream end of said choke.

7 Claims, 2 Drawing Figures

Patented Aug. 21, 1973

3,753,658

CARBON BLACK APPARATUS

This is a division of application Ser. No. 769,281 filed Oct. 21, 1968, now U.S. Pat. No. 3,619,141.

This invention relates to a process and to equipment for producing carbon black.

In one of its more specific aspects, this invention relates to process and related equipment for increasing the variety of blacks which can be produced in a single reactor.

Most carbon black reactors are limited as to the variety of blacks which they can produce. Generally, a reactor of a certain size and configuration is used to produce a limited number of blacks of certain qualities, while a reactor of a different size and configuration is used to produce blacks of other qualities.

It has now been determined that the product quality range for any axial reactor can be considerably extended by the use of a particular choke in the axial zone. By "product quality range" is meant the variety of carbon black having different property ranges. The wider the range of carbon black varieties producible in any one reactor, the fewer the reactors which will be required in order to produce the multitude of commercially important carbon blacks.

According to this invention, there is provided a carbon black reactor comprising a plurality of axially contiguous zones, there being positioned in the first of these zones a choke, the outer wall of which is positioned in peripheral contact with the inner wall of a reaction zone, the choke having a longitudinal bore, and being otherwise adapted to provide open communication between that portion of the reactor downstream of the choke and that portion of the reactor upstream of the choke.

In one embodiment of this invention, the choke is adapted to receive into the upstream end of its bore a truncated cone, the cone being adapted for the projection of the make-oil injection nozzle therethrough.

Also, in accordance with this invention, there is provided a process for the production of carbon black which comprises passing a first reactant mass at accelerated velocity through at least one portion of a first reaction zone, passing the first reactant mass into a second zone, commingling the first reactant mass with a second reactant mass in the second reaction zone to form a commingled reaction mass and passing a portion of the commingled reaction mass into the first reaction zone and passing a portion of the commingled reaction mass into a third reaction zone from which carbon black is recovered.

Accordingly, it is an object of this invention to provide an improved carbon black reactor.

It is another object of this invention to provide an improved process for the production of carbon black.

Figure 2:
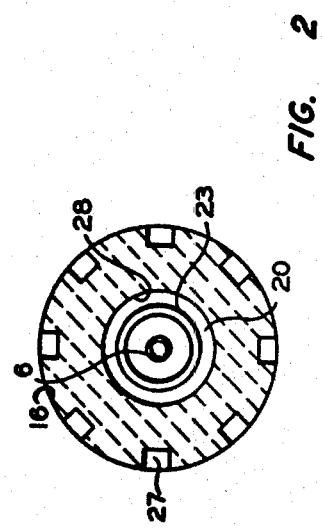

These, and other objects of this invention will be more easily understood by referring to the attached drawings in which FIG. 1 is a view in elevation of one embodiment of this invention and FIG. 2 is a sectional view through 2—2 of FIG. 1.

Referring now to FIG. 1, there is shown a carbon black reactor having axially contiguous zones 1, 2 and 3.

Zone 1 is the axial or feed introduction zone; zone 2 is a combustion zone; zone 3 is a carbon black formation zone from which the carbon black is recovered through outlet conduit 5.

Axial zone 1 is adapted with make oil inlet conduit 6 equipped with outlet nozzle 8. Outlet nozzle 8 is positionable at any place along the axial length of zone 1 by adjusting conduit 6 through packing gland 7.

In open communication with axial zone 1 is conduit 9, through which axial air is introduced, and conduit 10 through which a fuel can be introduced.

Combustion zone 2 is adapted with one or more entry ports 11 through which quantities of air, fuel, or make-oil, or any combination thereof, can be introduced to form a mass of hot combustion gas which enters the reaction zone in enveloping relation to the mass of reactants formed within zone 1.

Zone 3, the carbon black producing zone, is generally considered as the zone in which a principal portion of the carbon black is formed and from which the carbon black is removed from the reactor.

Axial zone 1 may be considered as extending to upstream wall 12 of zone 2. Zone 1 is preferably of circular configuration being enclosed by wall 16.

Variably positionable along the longitudinal axis of zone 1 is cone 20 which can be supported from make oil inlet conduit 6, or which can be separately supported on support 26, as shown. Cone 20 is a hollow, open cone such that reactants introduced into zone 1 flow into the base 24 of the cone, through the cone, and out through truncated opening 23. While the passageway through cone 20 is shown as conical, the passageway can be of any shape, but preferably it is of decreasing diameter in the direction of fluid flow through the cone.

Cone 20 can be of any length and of any diameter. It is preferable, however, that the diameter of its upstream base 24 be about one-half inch to about 3 inches less than the diameter of the axial zone 1. Cones having a length of from about one-third to about one-half of the length of axial zone 1 have been found satisfactory.

Cone 20 can be supported from support 26 which is adjustable along the length of axial zone 1 from the exterior of the reactor so as to allow positioning of the cone independently of oil inlet conduit 6. Hence, cone 20 and make-oil nozzle 8 can be adjustable independently of each other.

Located downstream of cone 20 is choke 14. This choke conforms exteriorly to the shape of axial zone 1 as defined by wall 16 and is adapted with a centrally located bore 28, and with slots, or openings, 27 in its outer wall, these slots being adapted to pass gas from the downstream side of the choke to its upstream side. The bore of the choke, at its minimum diameter, will be of sufficient size to allow the passage of make-oil nozzle 8 therethrough.

Any number of slots 27 may be employed in the outer surface of choke 14, it having been found that the number of slots is dependent upon the amount of gas it is desired to recycle back upstream of the choke. Preferably there are from about 2 slots to about 50 slots in the annular wall of the choke. The slots may be any suitable dimension and shape, it having been determined that slots are preferably sized in relation to the production capacity of the reactor, varying in width from about 0.25 to about 18 inches, and in depth from about 0.25 to about 5 inches. While these slots generally parallel the bore of the choke which, in turn, parallels the axis of the reactor, slots having a spiral configuration can be employed.

The slots generally will lie in the outer wall of the choke and will be formed on three sides by the choke and on the fourth side by wall 16 of axial zone 1 as shown in FIG. 2. This view, taken through Section 2—2 of FIG. 1, also shows conduit 6 extending through downstream opening 23 of cone 20.

Since the purpose of these openings in the choke is to provide passageway for some portion of the gases from the downstream side of the choke to the upstream side of the choke, these openings may be formed in any manner, and may be positioned at any point within the body of the choke. For example, the openings can be formed entirely within the choke wall, the wall of the choke encompassing the opening; or, the openings may be encompassed in part by the choke wall and in part by the wall of the axial zone. Generally, passageways formed in any manner, which provides open communication for the gases from the downstream side of the choke to its upstream side, can be employed. It will be understood that the reactants passed from the downstream side of the choke to its upstream side can consist solely of reactants introduced into the axial zone of the reactor, or of that commingled mass of reactants formed when some portion of the reactants are introduced into the combustion section of the reactor.

The length of the choke has not been found to be critical; lengths of about half that of the cone to lengths about equal to the length of the cone have been found to be satisfactory.

The diameter of the bore of the choke will be such that at its maximum dimension, it is less than the diameter of the base 24 of the cone; that is, the cone can be positioned partially into the bore of the choke with the results that all flow through the bore of the choke must also pass through the cone.

It will be understood that choke 14, cone 20, and nozzle 8 are independently positionable. Accordingly, any number of positional relationships can be established between these elements, such as withdrawal of cone 20 remote from choke 14, or the seating of cone 20 partially within choke 14. Similarly, nozzle 8 may be recessed into cone 20, for example, or may extend into zone 2. In like manner, choke 14 may be positioned at the upstream limit of zone 1 or may be positioned projecting into zone 2.

In the process of this invention, the introduction of the reactants through conduits 6, 9 and 10 forms a first reaction mass within zone 1. This reaction mass proceeds through zone 1 at a first velocity. As the reaction mass flows into cone 20, through base 24 and then through choke 14, its velocity will be increased within the first reaction zone.

The reaction mass formed in zone 1 passes through choke 14 and into the second reaction zone 2. Some portion of the reactants from the second reaction zone 2 pass from zone 2 back into reaction zone 1 through slots 27 of choke 14, the principal portion of reactants from zone 2 passing into the third reaction zone 3 from which carbon black is recovered.

Reactants can be introduced into zone 2 through ports 11 in commingling relationship with the first reaction mass, the commingled reaction mass then being passed into zone 3.

Depending upon the relative position of the choke and cone in the first reaction zone, a portion of the first reaction mass, that is, that portion flowing first through the zone, passes at increased velocity through at least two sections of the first reaction zone, while that portion of the first reaction mass by-passing the cone and passing through the choke only, passes at increased velocity through one section of the first reaction zone.

The process and apparatus of this invention have been employed in the production of carbon black and have been found to be influential on the quality of the carbon black produced, as indicated in the following data.

EXAMPLE 1

Two runs were made on identical charge stocks in an axial reactor employing, in one run, the slotted choke and cone of FIG. 1, and in the other run, a comparable, but unslotted choke, with cone. Nozzle positions, with reference to the distance upstream from the entrance to the combustion chamber, were identical.

In both instances, the axial tunnel, in which the choke was positioned, was 13 inches in diameter as was the maximum outside diameter of the choke. The cone was 20 inches long; its upstream end was 12⅜ inches in outside diameter and its downstream end was 4⅜ inches in outside diameter, its wall thickness being three-sixteenths inch. Hence, the inlet area of the cone was 113 square inches and its outlet was 12.6 square inches.

The slotted choke was 10 inches long and had a longitudinal bore or passageway 8 inches in diameter. It had six slots spaced evenly around its outer periphery, each slot being 2 inches deep, their total area being 57 square inches. The unslotted choke was also 10 inches long.

In the following two runs, the downstream extremity of the choke was positioned in alignment with the upstream edge of the combustion chamber, the downstream extremity of the cone being positioned in alignment with the upstream edge of the choke. The face of the oil discharge nozzle was positioned in vertical alignment with the downstream edge of the cone, that is, at a distance of 10 inches from the upstream edge of the combustion chamber. Results were as follows:

TABLE I

| Run Number | 1 | 2 |
|---|---|---|
| Description | Cone and Choke-Unslotted | Cone and Choke-Slotted |
| Charge Oil Rate, gal/hr. | 352 | 350 |
| Oil Inlet Temp., °F. | 400 | 400 |
| Nozzle Location, in.* | 12 | 12 |
| Axial Air, mscfh | 45 | 45 |
| Axial Gas, mscfh | 0 | 0 |
| Combustion Air, mscfh | 185 | 185 |
| Combustion Oxygen, mscfh | 3.3 | 3.3 |
| Combustion Gas, mscfh | 14 | 14 |
| Air to Oil Ratio SCF/GAL | 653 | 657 |
| Conversion, % C to black | 45.2 | 46.5 |
| Yield, lb./gal. | 4.23 | 4.37 |
| Carbon Black Properties | | |
| Photelometer | 87 | 89 |
| Surface Area, M²/gm | 81 | 93 |
| Structure, DBP, cc/100 gms | 133 | 145 |

*Distance upstream from upstream edge of combustion chamber

These data indicate the operability of the process and apparatus of this invention and show that at otherwise comparable conditions, the use of a slotted choke results in improved yields of carbon black and, at comparable photelometer values of the same type of black, results in a product of higher surface area and higher structure.

EXAMPLE II

A second series of runs was conducted as indicated by runs 3, 4 and 5, below. Runs 3 and 5 employed a cone and a choke, the choke of both runs being unslotted; run 4 employed the previously-described slotted choke and cone.

The downstream extremity of the choke was positioned in alignment with the upstream edge of the combustion chamber, the downstream extremity of the cone being positioned in alignment with the face of the discharge make-oil nozzle. The downstream openings of the cone, and the make-oil nozzle aligned therewith, were positioned 6 inches upstream of the choke in Run 3, 9 inches upstream of the choke in Run 4 and 11 inches upstream of the choke in Run 5.

Except for the slots, the unslotted choke was identical to the slotted choke, and the cone employed with the unslotted choke was the same as that used with the slotted choke.

In all instances, relative positions of choke to combustion chamber, and nozzles to cone, were as for the previous runs. Results were as follows:

TABLE II

| Run Number | 3 | 4 | 5 |
|---|---|---|---|
| Description | Cone & Choke— Un- slotted | Cone & Choke— slotted | Cone & Choke— Un- slotted |
| Charge Oil Rate, gal/hr. | 352 | 349 | 352 |
| Oil Inlet Temp., °F. | 400 | 400 | 400 |
| Nozzle Location, in.* | 16 | 19 | 21 |
| Axial Air, mscfh | 45 | 45 | 45 |
| Axial Gas, mscfh | 0 | 0 | 0 |
| Combustion Air, mscfh | 185 | 185 | 185 |
| Combustion Oxygen, mscfh | 3.3 | 3.3 | 3.3 |
| Combustion Gas, mscfh | 14 | 14 | 14 |
| Air to Oil Ratio, SCF/gal. | 653 | 659 | 653 |
| Conversion, % C to Black | 44.3 | 47.8 | 47 |
| Yield, lb./gal. | 4.15 | 4.49 | 4.38 |
| Carbon Black Properties | | | |
| Photelometer | 94 | 90 | 88 |
| Surface Area, M²/gm | 86 | 95 | 87 |
| Structure, DBP, cc/100 gms | 135 | 149 | 140 |

*Distance upstream from upstream edge of combustion chamber

It will be noted that the nozzle position using the slotted choke was intermediate those positions employed with the unslotted choke.

The data indicate that at an intermediate position of the nozzle, when using a slotted choke and producing black to a comparable photelometer value, under otherwise comparable conditions, the yield is improved and the structure and the surface area properties of the black are increased. These runs also indicate an increase in the over-all conversion of carbon to black when employing the apparatus and process of this invention. It is to be noted that, whereas the properties of the black produced by run 4 at the 19 inch nozzle location would be expected to have properties intermediate that black produced by runs 3 and 5 in respect to surface area and structure, the black produced by the apparatus and method of this invention had widely differing properties.

This unexpected result appears related to circulation patterns established within the reactor and most probably to the recirculation of the combustion gases from the combustion zone upstream into the axial zone. Such recirculation has been shown to occur upstream through the slots of the choke and back downstream into the combustion zone through the axial passageway of the choke. However, it has been determined that the use of a cone, alone, in the absence of a choke of any kind, influences the quality of the carbon black produced.

EXAMPLE III

Two runs were conducted producing carbon black in the same reactor. In one run, neither choke nor cone was used. In the other run, the cone previously described was employed in the absence of a choke, the make-oil nozzle being positioned at the downstream opening of the cone, as in the previous runs. Results were as follows:

TABLE III

| Run Number | 6 | 7 |
|---|---|---|
| Description | No Choke or Cone | Cone only |
| Charge Oil Rate, gal/hr. | 350 | 350 |
| Oil Inlet Temp., °F. | 405 | 405 |
| Nozzle Location, in. | 11 | 11 |
| Axial Air, mscfh | 35 | 35 |
| Combustion Air, mscfh | 165 | 165 |
| Combustion Gas, mscfh | 12.5 | 12.5 |
| Air to Oil Ratio, SCF/gal. | 573 | 573 |
| Conversion, % C to Black | 52 | 52 |
| Yield, lb/gal. | 4.8 | 4.8 |
| Carbon Black Properties | | |
| Photelometer | 90 | 90 |
| Surface Area, M²/gm | 76 | 76 |
| Structure, DBP, cc/100 gms | 149 | 155 |

These data indicate that the use of a cone, alone, to direct at least a portion of the axial reaction zone reactants across the make-oil nozzle discharge is effective in changing the structure of the carbon black produced. The entrance area of the cone represented, in the above run, was approximately 90 percent of the free flow area of the axial zone, the flow area around the cone at its upstream end representing some 10 percent of the free flow area of the axial zone.

It has been determined that the use of a cone is effective when between about one per cent and about 50 percent of the total flow through the axial zone, preferably about 10 percent to about 40 percent, exclusive of make-oil, is by-passed around the cone, the balance of the material being directed through the cone.

In respect to the dimensions of the choke, the ratio of the area of the axial bore or passageway of the choke to the area of the downstream, or outlet, end of the cone has been found to be preferably from about 2 to 1 to about 10 to 1.

With reference to the area of the slots of the choke, and in this respect, to the amount of the gases flowing to the upstream side of the choke into the axial tunnel from the downstream side of the choke, it has been found that the total area of the slots to the area of the axial passageway or bore through the choke preferably ranges from about 0.1 to 1 to about 3 to 1.

In respect to the quantity of materials flowing, the volume of reactants passing from the second reaction zone upstream through the slots of the choke into the first reaction zone is about 0.01 to about 0.4 times the total volume of reactants flowing from the first reaction zone into the second reaction zone through the axial passageway of the choke.

These relationships are advantageously maintained either individually, that is, when employing only one element, or in combination, that is, when employing the choke and cone in combination. Similarly, these elements are effective in any size reactor when employing any conventional make oil to produce carbon black under any conventional operating conditions.

While the invention has been discussed herein in relation to certain embodiments, it will be appreciated that certain modifications thereto can be made. For example, a choke having a bore varying in diameter along its length can be employed, the choke being equipped either with peripheral slots or passageways encompassed by the body of the choke. Similarly, cones having apertured side walls can be used. Similarly, means can be employed in conjunction with the cone to effect aspiration of some portion of gas upstream around the edge of the base of the cone, such means being integral with the cone or separate and individually adjustable in relation thereto.

Variations such as these, however, are not to be considered as being outside of the scope of this invention.

What is claimed is:

1. A carbon black reactor comprising:
   a. a chamber comprising an axial section, a combustion section and a carbon black production section;
   b. a hollow cylindrical choke movably positionable in said axial section;
   c. a hollow truncated cone movably positionable within said axial section, said cone being adapted at its downstream end for insertion into the upstream end of said choke;
   d. feed introduction conduit means movably positionable to extend through said choke and said cone; and,
   e. conduit means opening from said carbon black production section for the removal of carbon black.

2. The carbon black reactor of claim 1 in which said cone is supported on said feed introduction conduit means.

3. The carbon black reactor of claim 1 in which said choke is adapted with a plurality of passageways peripheral to the centrally-positioned bore of said choke.

4. The carbon black reactor of claim 3 in which said plurality of passageways are positioned parallel to said bore of said choke.

5. The carbon black reactor of claim 2 in which said choke has a length of about one-half the length of said cone.

6. The carbon black reactor of claim 2 in which said choke has a length about equal to the length of said cone.

7. The carbon black reactor of claim 4 in which said choke has a length within the range of from about 0.5 to about 1 times the length of said cone.

* * * * *